(12) United States Patent
Dietz

(10) Patent No.: US 6,848,787 B2
(45) Date of Patent: *Feb. 1, 2005

(54) OFFSET EYEGLASSES CLASP

(76) Inventor: Dan L. Dietz, 10234 Emerald Dr., Houston, TX (US) 77074

( * ) Notice: Subject to any disclaimer, the term of this patent is extended or adjusted under 35 U.S.C. 154(b) by 0 days.

This patent is subject to a terminal disclaimer.

(21) Appl. No.: 10/301,232

(22) Filed: Nov. 21, 2002

(65) Prior Publication Data
US 2004/0125333 A1 Jul. 1, 2004

(51) Int. Cl.7 ................................................ G02C 5/14
(52) U.S. Cl. .................................................. 351/112
(58) Field of Search ........................... 351/41, 63, 111, 351/112; 2/454; D16/303

(56) References Cited

U.S. PATENT DOCUMENTS

| | | | |
|---|---|---|---|
| 1,898,059 A | 2/1933 | McDonald | |
| 1,973,648 A | 9/1934 | Nagel | 88/41 |
| 3,498,701 A | 3/1970 | Miller | 351/57 |
| 3,531,188 A | 9/1970 | LeBlanc et al. | 351/48 |
| 3,565,517 A | 2/1971 | Gitlin et al. | 351/106 |
| 3,582,192 A | 6/1971 | Gitlin et al. | 351/52 |
| 3,838,914 A | 10/1974 | Fernandez | 351/106 |
| 4,050,785 A | 9/1977 | Auge | 351/120 |
| 4,070,103 A | 1/1978 | Meeker | 351/52 |
| 4,196,981 A | 4/1980 | Waldrop | 351/59 |
| 4,316,654 A | 2/1982 | Allen | 351/10 |
| 4,496,224 A | 1/1985 | Allen | 351/155 |
| 4,541,125 A | 9/1985 | Phillips | 2/10 |
| 4,662,729 A | 5/1987 | Dobson | 351/123 |
| 4,747,183 A | 5/1988 | Drlik | 16/228 |
| 4,771,515 A | 9/1988 | Guarro | 24/3 |
| 4,809,406 A | 3/1989 | Tsai | 24/3 |
| 4,903,375 A | 2/1990 | DiFranco | 24/3 |
| 4,946,125 A | 8/1990 | McCarty | 248/316.7 |
| 4,949,432 A | 8/1990 | Wisniewski | 24/3 |
| 5,005,263 A | 4/1991 | Barrett | 24/3 |
| 5,018,242 A | 5/1991 | Guy et al. | 16/228 |
| 5,123,724 A | 6/1992 | Salk | 351/57 |
| 5,235,727 A | 8/1993 | McCloskey | 24/3 |
| 5,328,411 A | 7/1994 | Thornton, II | 473/36 |
| 5,351,098 A | 9/1994 | McDaniels et al. | 351/112 |
| 5,355,184 A | 10/1994 | Varveris et al. | 351/106 |
| 5,372,345 A | 12/1994 | Schmidt | 248/231.8 |
| 5,389,981 A | 2/1995 | Riach, Jr. | 351/158 |

(List continued on next page.)

FOREIGN PATENT DOCUMENTS

| | | |
|---|---|---|
| CN | 2510884 Y | 9/2002 |
| EP | 0 385 002 | 9/1990 |
| JP | 53-124455 | 10/1978 |
| JP | 54-21357 | 2/1979 |
| JP | 9-33865 | 2/1997 |
| JP | 11-64804 | 3/1999 |
| JP | U3097213 | 8/2003 |

Primary Examiner—Huy Mai
(74) Attorney, Agent, or Firm—Conley Rose, P.C.

(57) ABSTRACT

An eyeglasses clasp for maintaining eyeglasses on a clothing material. The clasp comprises at least one magnetic means engaged with the eyeglasses temple bars that align with each other but not with the eyeglasses frame body midpoint when the temple bars are closed. The magnets are in attractive magnetic communication when the temple bars are closed. The clasp is used by pivoting one of the temple bars into the closed position. The frame body and closed temple bar are then positioned on one side of a clothing material. The second temple bar is then pivoted into the closed position such that it is on the other side of the clothing material. With the temple bars closed, the magnets are in attractive magnetic communication and impart a gripping force on the article of clothing. The gripping force substantially prevents relative movement between the temple bars and the clothing material.

39 Claims, 10 Drawing Sheets

U.S. PATENT DOCUMENTS

| | | | |
|---|---|---|---|
| 5,408,279 A | 4/1995 | Chiou | 351/121 |
| 5,408,728 A | 4/1995 | Wisniewski | 24/3 |
| 5,414,906 A | 5/1995 | Kren | 24/3.3 |
| 5,416,537 A | 5/1995 | Sadler | 351/57 |
| 5,491,878 A | 2/1996 | Janouschek | 24/3.3 |
| 5,568,207 A | 10/1996 | Chao | 351/57 |
| 5,630,258 A | 5/1997 | Schneider | 24/303 |
| 5,682,222 A | 10/1997 | Chao | 351/111 |
| 5,719,655 A | 2/1998 | Peschel et al. | 351/111 |
| 5,737,054 A | 4/1998 | Chao | 351/47 |
| 5,768,716 A * | 6/1998 | Porsche | 2/454 |
| 5,786,880 A | 7/1998 | Chao | 351/41 |
| 5,877,838 A | 3/1999 | Chao | 351/47 |
| 5,882,101 A | 3/1999 | Chao | 351/47 |
| 5,883,688 A | 3/1999 | Chao | 351/47 |
| 5,883,689 A | 3/1999 | Chao | 351/47 |
| 5,929,964 A | 7/1999 | Chao | 351/47 |
| 5,936,700 A | 8/1999 | Masunaga | 351/47 |
| 5,940,162 A | 8/1999 | Wong | 351/47 |
| D417,462 S | 12/1999 | Chang | D16/327 |
| 6,012,811 A | 1/2000 | Chao et al. | 351/47 |
| 6,017,120 A | 1/2000 | McCormick | 351/112 |
| 6,027,214 A | 2/2000 | Graham | 351/57 |
| 6,033,068 A * | 3/2000 | Spilkin et al. | 351/112 |
| 6,045,221 A | 4/2000 | Resendez, Sr. | 351/112 |
| 6,053,611 A | 4/2000 | Ku | 351/47 |
| 6,092,896 A | 7/2000 | Chao et al. | 351/47 |
| 6,109,747 A | 8/2000 | Chao | 351/47 |
| 6,116,732 A | 9/2000 | Xiao | 351/47 |
| 6,132,040 A | 10/2000 | Xiao | 351/47 |
| 6,139,141 A | 10/2000 | Zider | 351/57 |
| 6,139,142 A | 10/2000 | Zelman | 351/57 |
| 6,149,269 A | 11/2000 | Madison | 351/147 |
| 6,164,774 A | 12/2000 | Cate | 351/47 |
| 6,168,273 B1 | 1/2001 | Dupraz et al. | 351/158 |
| 6,170,948 B1 | 1/2001 | Chao | 351/47 |
| 6,170,949 B1 | 1/2001 | Mauch | 351/47 |
| 6,206,519 B1 | 3/2001 | Lin | 351/47 |
| 6,210,003 B1 | 4/2001 | Chan | 351/112 |
| 6,217,170 B1 | 4/2001 | Hsiao | 351/153 |
| 6,331,057 B1 | 12/2001 | Strube | 351/47 |
| RE37,545 E | 2/2002 | Chao | 351/57 |
| 6,343,858 B1 | 2/2002 | Zelman | 351/47 |
| 6,367,126 B1 | 4/2002 | Rivkin | 24/3.3 |
| 6,375,324 B2 * | 4/2002 | Schleger et al. | 351/121 |
| 6,412,942 B1 | 7/2002 | McKenna et al. | 351/47 |
| 6,425,664 B1 * | 7/2002 | Liu et al. | 351/112 |
| 6,450,637 B1 | 9/2002 | Zelman | 351/47 |
| 6,488,372 B1 | 12/2002 | Park | 351/47 |
| 6,505,932 B2 | 1/2003 | Xiao | 351/47 |
| 6,568,805 B1 * | 5/2003 | Dietz | 351/112 |

* cited by examiner

OFFSET EYEGLASSES CLASP

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to improved eyeglasses. More particularly, it relates to an offset eyeglasses clasp for maintaining the eyeglasses in a pocket or on another portion of a clothing material when the eyeglasses are not in use.

2. Description of the Related Art

Typical eyeglasses consist of a frame body that houses two lenses on either side of a nose piece. Attached to the frame body are two temple bars that extend from two ends of the frame body. The temple bars pivot between an open position perpendicular with the frame body and a closed position parallel with the frame body. The temple bars and nose piece support the frame on the head of the wearer.

Individuals often remove their eyeglasses temporarily. They may put them down and not recall where, they may hang them around their neck where they bounce against their chest, or they may put them in a pocket and have them fall out and/or get damaged.

To solve this problem, the prior art teaches using mechanical clasps to clip eyeglasses to a garment worn by the user. These are cumbersome and, like all mechanical clasps, may come loose. Some mechanical clasps also depend on the availability of a shirt pocket, a cap visor, belt, holder, straps, or the like. In addition, clips may work well initially, but fatigue can cause metal clips to weaken and lose their ability to hold eyeglasses securely. Moreover, clips can break, thereby causing the eyeglasses to come loose, fall and break, or be lost. U.S. Pat. No. 6,017,120 to McCormick teaches a mechanical clip attached to the hinged end of the temple bars. Eyeglasses using such mechanical clips may not be securely held in place when inverted, such as when a person bends over at the waist. Another problem with such clips arises when a person in a sitting position bends forward, and the eyeglasses are pushed upward while clasped inside a shirt pocket. In that situation, the clip may be pushed up from the bottom of the pocket, thereby disengaging the clip and causing the eyeglasses to fall from the pocket.

The use of magnets on eyeglass frames for various purposes is also well known in the art. For example, a number of eyeglass frames have magnets that magnetize the wearer for health benefits. Other eyeglass frames use magnets to hold eyeglass frame sections together, thereby facilitating disassembly and reassembly in a new configuration, with auxiliary frames, lenses, or the like. U.S. Pat. No. 6,168,273 B11 to Dupraz et al. teaches the use of magnets on eyeglass frames to temporarily affix the eyeglasses on a support article having magnetic means. Because the magnets in Dupraz et al. are attached to the temple bar near the hinges, however, its teaching cannot be used as a magnetic clasp, nor was it intended as such.

SUMMARY OF THE EMBODIMENTS

One embodiment of the eyeglasses clasp comprises magnets engaged with the temple bars of eyeglasses. The magnets are located different distances away from the eyeglass frame body on each temple bar such that they align with each other but not with the frame body midpoint when in the closed position. The magnets are in attractive magnetic communication at least when the temple bars are in the closed position. The magnets include a hollow space extending through the magnets that is large enough to slide the magnets onto the temple bars.

The clasp is typically used by pivoting one of the temple bars into the closed position. The frame body and closed temple bar are then positioned on one side of a clothing material, such as, by way non-limiting example only, a shirt pocket or sleeve. The second temple bar is then pivoted into the closed position such that it is on the other side of the clothing material. The magnets are then in attractive magnetic communication and impart a gripping force on the clothing material. The gripping force substantially prevents relative movement between the temple bars and the clothing material. The offset magnetic clasp thereby eliminates the disadvantages of a mechanical clip while introducing the advantage of a strong, versatile clasp that can be easily opened and closed anywhere the magnets are capable of being in strong enough attractive magnetic communication through the clothing material.

In another embodiment of the eyeglasses, there is more than one magnet on one of the temple bars, with a corresponding number of magnets on the other temple bar.

In another embodiment of the eyeglasses, magnets engage a specialized configuration of the temple bars themselves.

In another embodiment, the magnets on the temple bars each comprise two "half" magnets on either side of the temple bar. The magnets engage the temple bars by being in attractive magnetic communication with each other. The "half" magnets may also engage the temple bars with the use of an adhesive and be held in place by shrink-wrap tubing. The half magnets may also engage the temple bars by the use of a screw.

In another embodiment, at least one of the magnets is rectangular and is positioned on top of the temple bar. The location of one of the magnets on top of the temple bar reduces impact wear on the magnets when they are pivoted to the closed position.

The embodiments of the eyeglasses clasp may be in the form of complete eyeglasses, temple bars with magnetic means attached thereto, or a kit comprising a magnetic means and a means of attaching the magnetic means to temple bars, with or without temple bars or other eyeglass components.

Thus, the embodiments comprise a combination of features and advantages that enable them to overcome various problems of prior devices. The various characteristics described above, as well as other features, will be readily apparent to those skilled in the art upon reading the following detailed description of the embodiments, and by referring to the accompanying drawings.

BRIEF DESCRIPTION OF THE DRAWINGS

For a more detailed description of the embodiments, reference will now be made to the following accompanying drawings.

DETAILED DESCRIPTION OF THE EMBODIMENTS

The present invention relates to an eyeglasses clasp and is susceptible to embodiments of different forms. The drawings and the description below disclose in detail specific embodiments of the present invention with the understanding that this disclosure is to be considered an exemplification of the principles of the invention, and is not intended to limit the invention to that illustrated and described in the disclosure. Further, it is to be fully recognized that the different teachings of the embodiments discussed below may be employed separately or in any suitable combination to produce desired results.

Figure 1A:
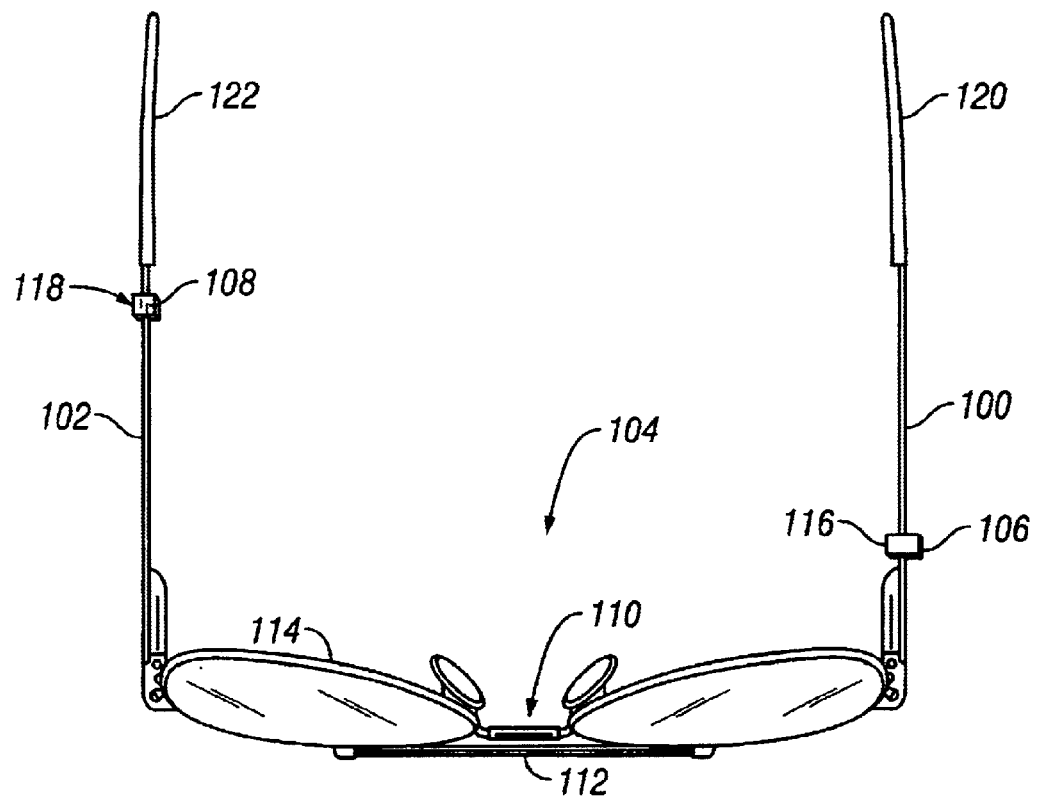
FIG. 1A is a bottom view of eyeglasses incorporating an eyeglasses clasp with temple bars pivoted in the open position as when the eyeglasses are worn.
Figure 1B:
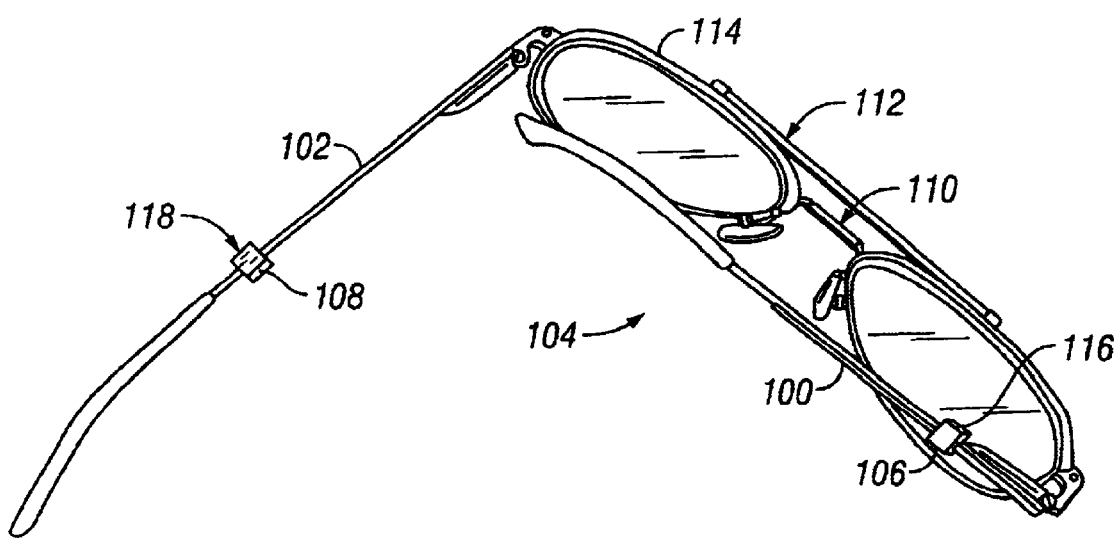
FIG. 1B is a perspective view of the eyeglasses incorporating an eyeglasses clasp with one of the temple bars pivoted into the closed position.
Figure 1C:
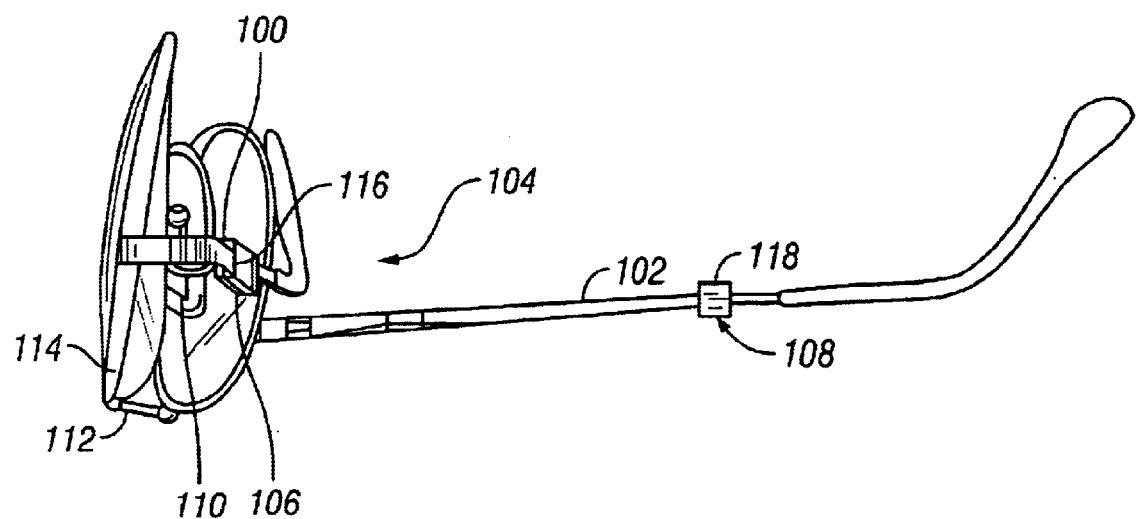
FIG. 1C is a side view of the eyeglasses incorporating an eyeglasses clasp with one of the temple bars pivoted into the closed position.
Figure 1D:
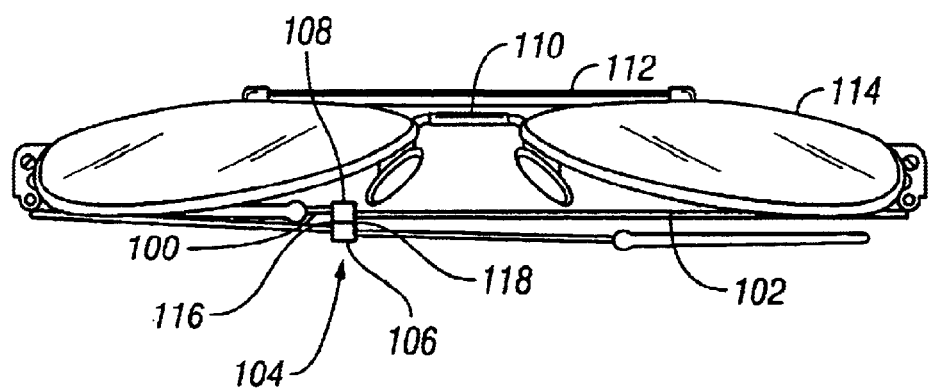
FIG. 1D is a bottom view of the eyeglasses incorporating an eyeglasses clasp with the temple bars pivoted into the closed position.

Referring initially to FIGS. 1A–1D, there is shown an embodiment of the eyeglasses clasp 104. A right temple bar 100 and a left temple bar 102 are pivotally attached to an eyeglasses frame body 114 by any suitable means. Typically, the temple bars 102, 103 are pivotally attached by spring action hinges well known in the art. The temple bars 100, 102 pivot between an open position perpendicular to the eyeglasses frame body 114 and a closed position parallel to the frame body 114. When in the open position, the temple bars form a squared "U" shape as illustrated in FIG. 1A. In addition, the temple bar 100 includes an earpiece 120 and the temple bar 102 includes an earpiece 122. The frame body 114 also includes a nose piece 112 and has a midpoint 110. A first magnetic means 106 engages the temple bar 100 and a second magnetic means 108 engages the temple bar 102 such that the polarity of the magnetic means 106, 108 directed outside the "U" in FIG. 1A is the same. The magnetic means 106, 108 are located different distances away from the eyeglasses frame body 114 on the temple bars 100, 102 such that they align with each other but not with the eyeglasses frame body midpoint 110 when the temple bars 100, 102 are in the closed position. Thus, as illustrated in FIG. 1D, when temple bars 100, 102 are pivoted closed, the magnetic means 106, 108 are in attractive magnetic communication created by the opposite poles of the magnetic means 106, 108. FIG. 1D shows left temple bar 102 folded on the inside of right temple bar 100. The South pole side 116 of the magnetic means 106 thus faces and aligns with the North pole side 118 of the magnetic means 108, thereby holding the temple bars securely in the closed position.

The means for attaching the magnetic means 106, 108 to the temple bars 100, 102 may depend on the material from which the temple bars are made. It should be appreciated that any suitable method may be used for engaging the magnetic means with the temple bars. Such attachment means for various temple bar materials include, by way of non-limiting example, grooved means, adhesive means, shrink-wrap tubing, hinged clips, metal clamps, threaded hardware, and the like, and/or a combination thereof. As shown in FIGS. 1A–1D, the magnetic means 106, 108 have a hollow space extending through the magnetic means that is large enough to fit over the temple bars 100, 102. The hollow magnetic means are typically installed by removing the earpieces 120, 122, sliding the hollow magnetic means onto the temple bars 100, 102, and then replacing the earpieces 120, 122. In addition, the magnetic means 106, 108 may be protected from corrosion by a number of means, including by way of non-limiting example, coatings of zinc, nickel, copper, gold, different colored epoxy, aluminum chromate, and/or different types of paint.

The eyeglasses clasp 104 is not limited to a complete set of eyeglasses, but may also comprise temple bars with magnetic means attached thereto, or a kit comprising a magnetic means and a means of attaching the magnetic means to temple bars, with or without temple bars or other eyeglass components therein.

Figure 2A:
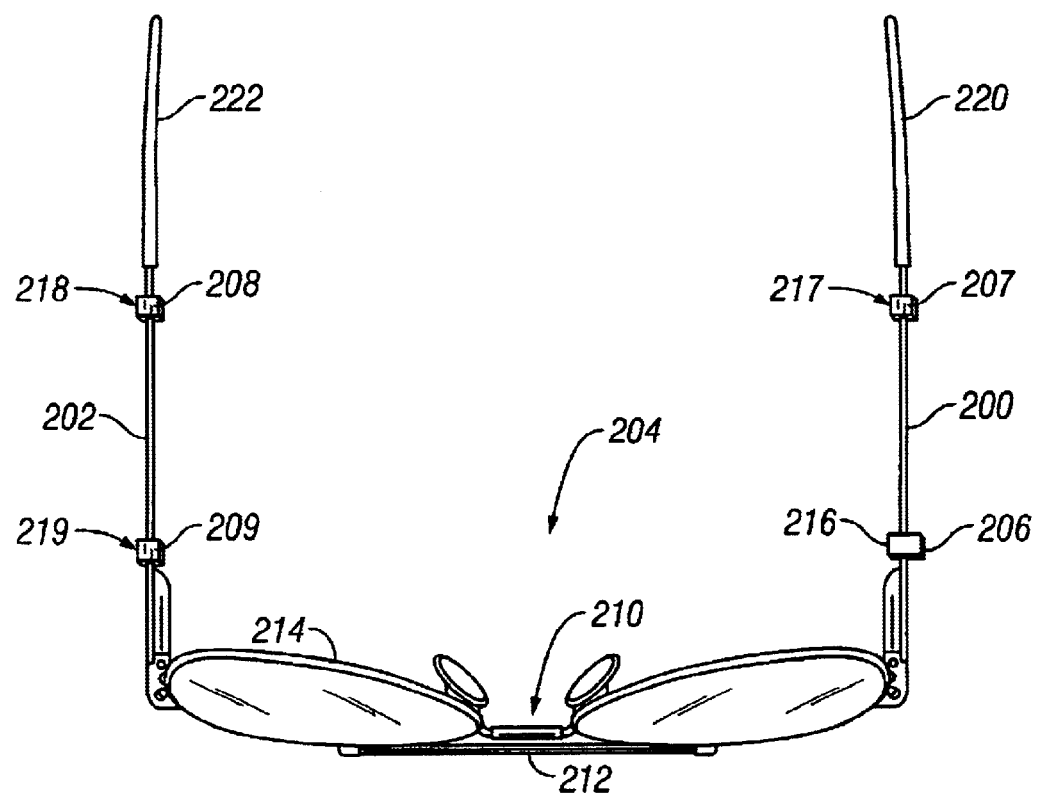
FIG. 2A is a bottom view of another embodiment of the eyeglasses clasp.
Figure 2B:
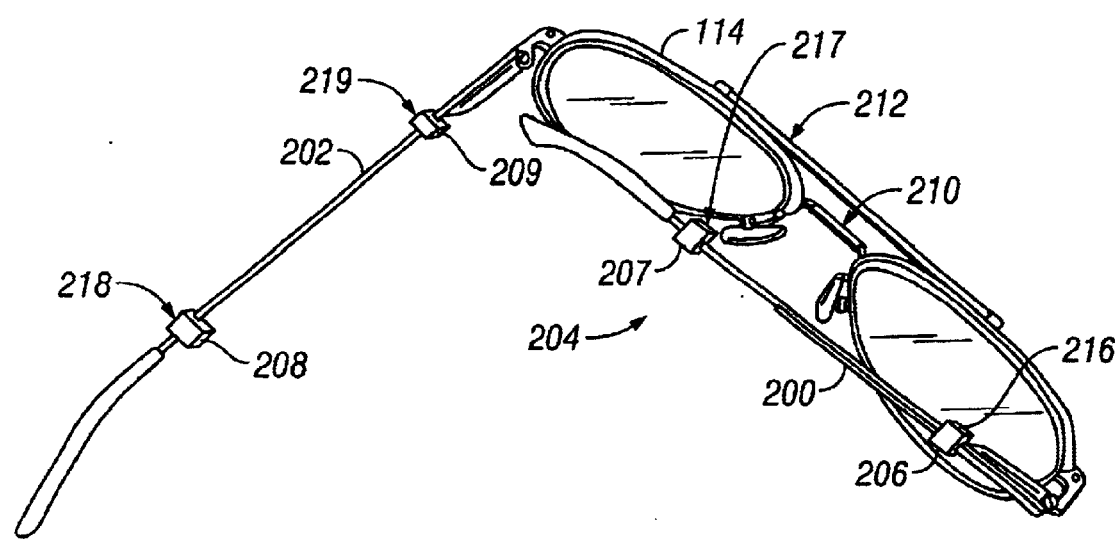
FIG. 2B is a perspective view of the eyeglasses incorporating the eyeglasses clasp of FIG. 2A.

Referring now to FIGS. 2A and 2B, there is shown an embodiment of an eyeglasses clasp 204. The clasp 204 includes a right temple bar 200 and a left temple bar 202 pivotally attached to an eyeglasses frame body 214 by any suitable means. Typically, the temple bars 202, 203 are pivotally attached by spring action hinges well known in the art. The temple bars 200, 202 pivot between an open position perpendicular to the eyeglasses frame body 214 and a closed position parallel to the frame body 214. When in the open position, the temple bars form a squared "U" shape as illustrated in FIG. 2A. In addition, the temple bar 200 includes an earpiece 220 and the temple bar 202 includes an earpiece 222. The frame body 214 also includes a nose piece 212 and has a midpoint 210. A first magnetic means 206 engages the temple bar 200 and a second magnetic means 208 engages the temple bar 202 such that the polarity of the magnetic means 206, 208 directed outside the "U" in FIG. 2A is the same. The magnetic means 206, 208 are located different distances away from the eyeglasses frame body 214 on the temple bars 200, 202 such that they align with each other but not with the eyeglasses frame body midpoint 210 when the temple bars 200, 202 are in the closed position. Similarly, a third magnetic means 207 engages the temple bar 200 and a fourth magnetic means 209 engages the temple bar 202 such that the polarity of the third and fourth magnetic means 207, 209 is directed outside the "U" in FIG. 2A is the same. The third and fourth magnetic means 207, 209 are located different distances away from the eyeglasses frame body 214 on the temple bars 200, 202 such that they align with each other but not with the frame body midpoint 210 when the temple bars 200, 202 are in the closed position. Thus, when the temple bars 200, 202 are pivoted closed, the magnetic means 206, 208 are in attractive magnetic communication created by the opposite poles of the magnetic means 206, 208, thereby holding the temple bars 200, 202 securely in the closed position. Similarly, when the temple bars 200, 202 are pivoted closed, the magnetic means 207, 209 are in attractive magnetic communication created by the opposite poles of the magnetic means 207, 209, thereby also holding the temple bars 200, 202 securely in the closed position.

The eyeglasses clasp 204 is not limited to a complete set of eyeglasses, but may also comprise temple bars with magnetic means attached thereto, or a kit comprising a magnetic means and a means of attaching the magnetic means to temple bars, with or without temple bars or other eyeglass components therein.

Figure 3A:
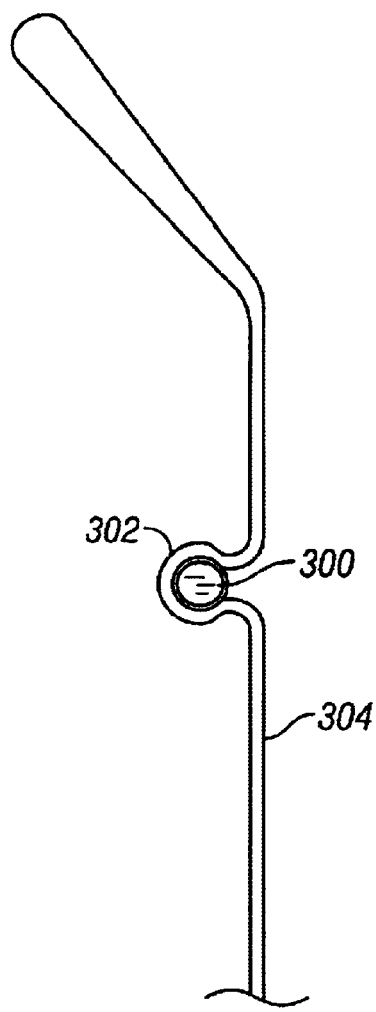
FIG. 3A is a side view of another embodiment of the eyeglasses clasp showing an eyeglasses temple bar with the magnet held in a semi-loop in the temple bar.
Figure 3B:
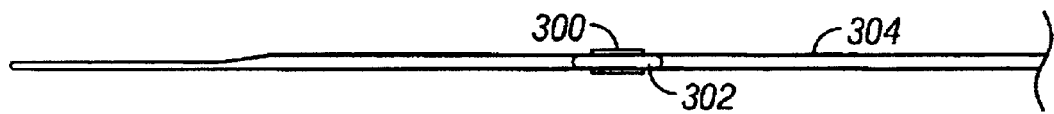
FIG. 3B is a bottom view of an eyeglasses temple bar incorporating the eyeglasses clasp of FIG. 3A with the magnet held in a semi-loop in the temple bar.
Figure 3C:
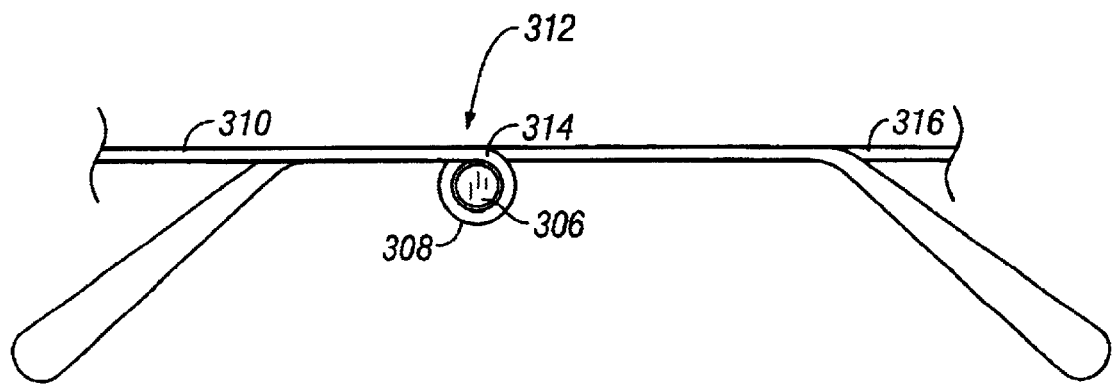
FIG. 3C is a rear view of eyeglasses temple bars pivoted in the closed position and incorporating the eyeglasses clasp of FIG. 3A with the magnet held in a loop in the temple bar.
Figure 3D:
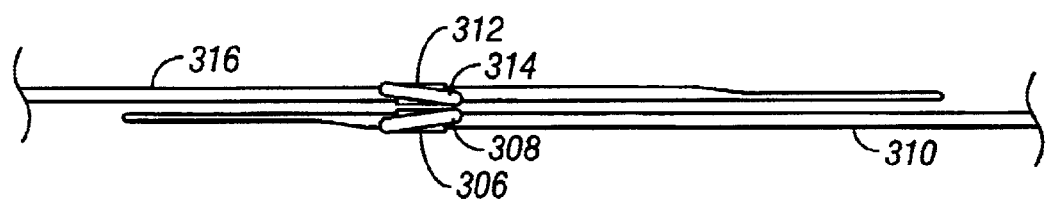
FIG. 3D is a bottom view of the eyeglasses temple bars pivoted in the closed position and incorporating the eyeglasses clasp of FIG. 3A with the magnet held in a loop in the temple bar.

Referring now to FIGS. 3A–3D, there is shown the temple bars 304, 310, and 316 of other embodiments of the eyeglasses clasp 104. FIGS. 3A and 3B show the magnetic means 300 engaged with the temple bar 304 by a semi-loop 302 in the temple bar 304. In FIGS. 3C and 3D, a first magnet 306 engages full loop 308 in the temple bar 310, and a second magnet 312 engages full loop 314 of the temple bar 316. The polarity of magnets 306, 312 are opposite when the temple bars 310, 316 are in the closed position as shown in FIG. 3D. Thus, the magnets 306, 312 are attracted to each other by the magnetic attraction created by their opposite poles. The semi-loop 302 of the temple bar 304 and the full loop 308 of the temple bars 310, 316 are located such that the magnets 300, 306, 312 on respective temple bars align with each other when the temple bars are in the closed position, but not with the midpoint 110 of nose piece 112 as shown in FIG. 1D. The size of the semi-loop 302 and the full loops 308, 314 may be selected to accommodate the diameter of magnets 300, 306, and 312 respectively, which may be held in place by adhesive means, or by any other suitable means.

As illustrated in FIGS. 3A–3D, the means for engaging the magnetic means may require modification of existing eyeglasses temple bars to accommodate attachment of a magnet. Thus, the eyeglasses clasp is not limited to a complete set of eyeglasses, but may also comprise temple bars with magnetic means attached thereto, or a kit comprising a magnetic means and a means of attaching the magnetic means to temple bars, with or without temple bars or other eyeglass components therein.

Figure 4A:
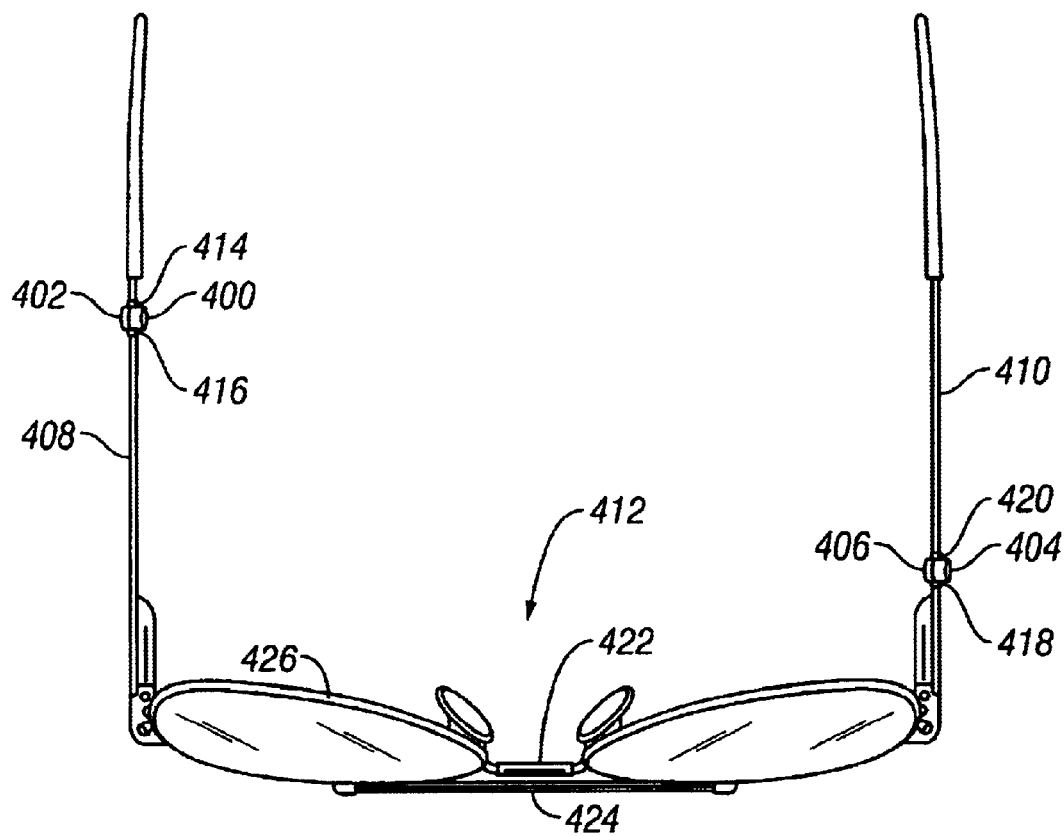
FIG. 4A is a side view of an eyeglasses temple bar incorporating an eyeglasses clasp constructed in accordance with another embodiment of the eyeglasses clasp with the magnet in shrink-wrap tubing.
Figure 4B:
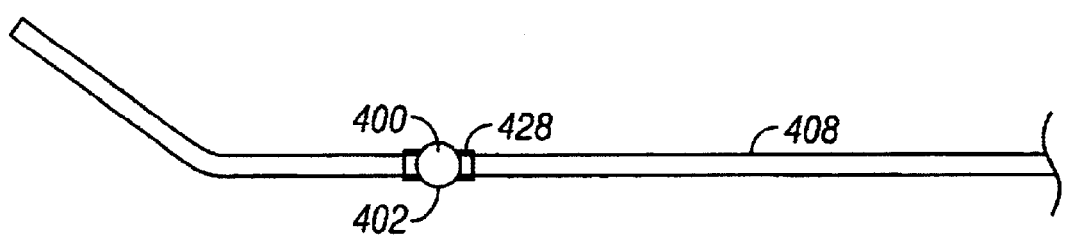
FIG. 4B is a bottom view of an eyeglasses temple bar incorporating the eyeglasses clasp of FIG. 4A with the magnet in shrink-wrap tubing.
Figure 4C:
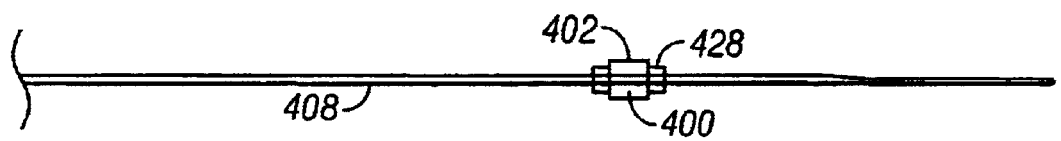
FIG. 4C is a top view of an eyeglasses temple bar incorporating the eyeglasses clasp of FIG. 4A with the magnet affixed to the temple bar with a small screw.
Figure 4D:
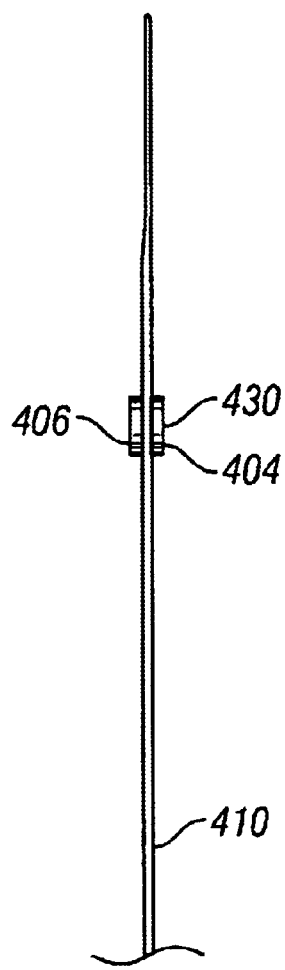
FIG. 4D is a side view of an eyeglasses temple bar incorporating the eyeglasses clasp of FIG. 4A with the magnet affixed to the temple bar with a small screw.
Figure 4E:
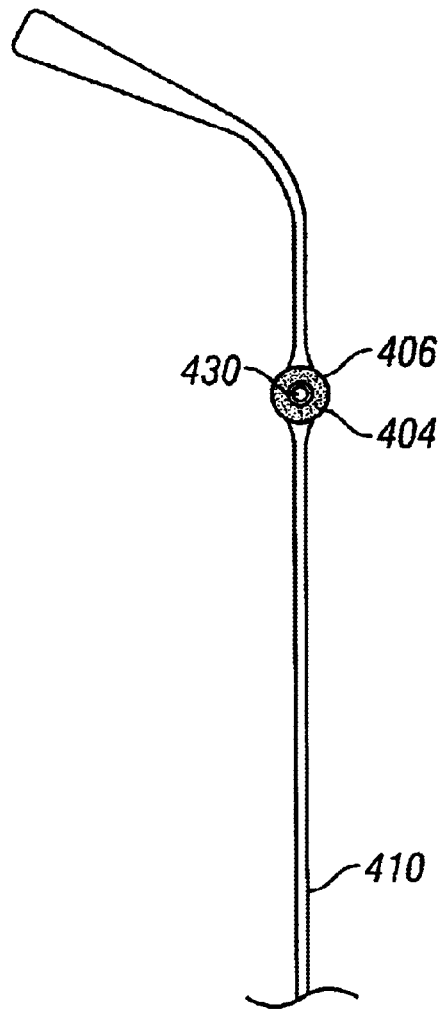

Referring now to FIGS. 4A–4E, there is shown another embodiment of the eyeglasses clasp 412. In FIG. 4A, a first half magnet 400 and a second half magnet 402 engage the temple bar 408 of the frame body 426. A third half magnet 404 and a fourth half magnet 406 engage the temple bar 410. Half magnets 400, 402 engage the left temple bar 408 such that the North pole side 414 of the half magnet 400 faces and aligns with the South pole side 416 of the half magnet 402. Similarly, the half magnets 404, 406 engage the right temple bar 410 such that the North pole side 418 of the half magnet 406 faces and aligns with the South pole side 420 of the half magnet 404. As in FIG. 1, half magnets 400, 402, 404, and 406 are positioned at different lengths on the temple bars 408, 410 from the frame body 426 such that when the temple bars 408, 410 are closed, the half magnets 400, 402, 404, and 406 align with each other but not with the midpoint 422 of the frame body 426. In FIGS. 4B and 4C, the half magnets 400, 402 engage the temple bar 408 with shrink-wrap tubing 428. However, in FIGS. 4D and 4E, the half magnets 404, 406 engage the temple bar 410 with a screw 430. As described above, it should be appreciated that various engagement means suitable for the material from which temple bars 408 and 410 is made may be used.

As illustrated in FIGS. 4A–4E, the temple bars 408, 410 do not have to be modified for there to be magnetic attraction between the magnetic means, regardless of which temple bar is closed first. Thus, this embodiment may comprise two temple bars with magnetic means, or, when sold as a kit, this embodiment may comprise four magnets and a means of attaching pairs of the magnets to existing temple bars.

Figure 5A:
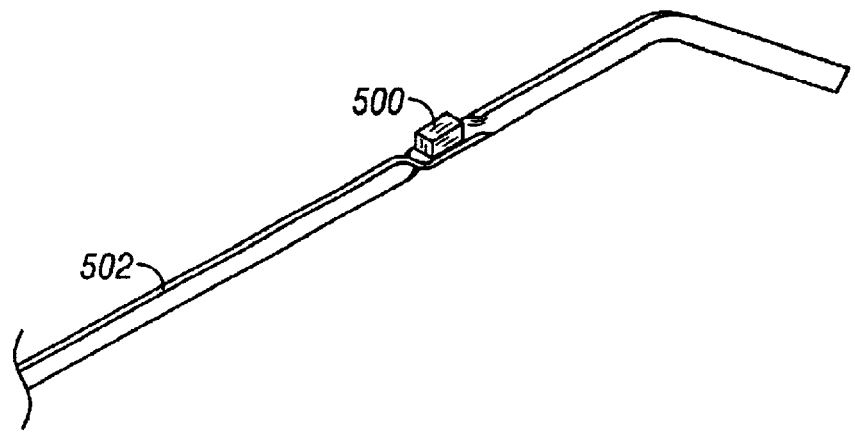
FIG. 5A is a perspective view of an eyeglasses temple bar incorporating another embodiment of an eyeglasses clasp with a rectangular magnet.
Figure 5B:
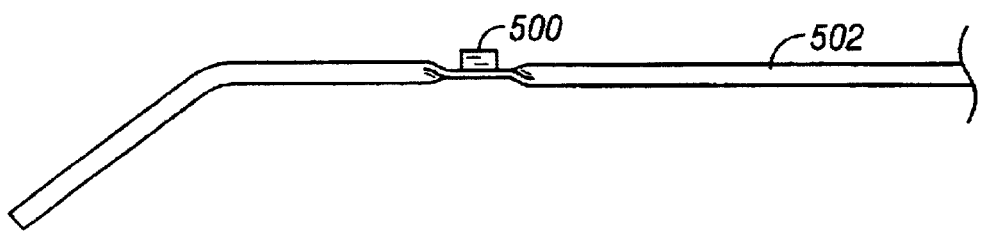
FIG. 5B is a side view of an eyeglasses temple bar incorporating the eyeglasses clasp of FIG. 5A with a rectangular magnet.
Figure 5C:
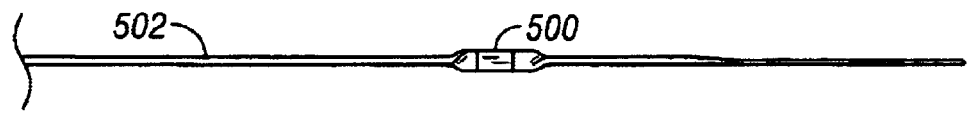
FIG. 5C is a top view of an eyeglasses temple bar incorporating the eyeglasses clasp of FIG. 5A with a rectangular magnet.

Referring now to FIGS. 5A–5C, there is shown a temple bar 502 of another embodiment of the eyeglasses clasp 104. Clasp 104 comprises a rectangular magnet 500 attached to the temple bar 502 and magnetic means 106 on the temple bar 100 shown in FIG. 1. The magnet 500 aligns with the magnetic means 106 but does not align with the frame body midpoint 110 when the temple bar 502 is pivoted into the closed position. The polarity of the magnet 500 is such that the magnet 500 is attracted to the magnetic means 106 on the temple bar 100 in FIG. 1 when both temple bars 100, 502 are pivoted in the closed position. The magnet 500 is rectangular and located on the top of the temple bar 502 to protect the magnet 500 from coming into striking contact with magnetic means 106 when the temple bars, 100, 502 are pivoted into the closed position. By not coming into striking contact, the magnetic means 106 and the magnet 500 are not as susceptible to being damaged or disengaged from the temple bars 100, 502. It should be appreciated that the magnetic means 106 and magnet 500 may engage either temple bar and still be within the scope of the invention.

Figure 6:
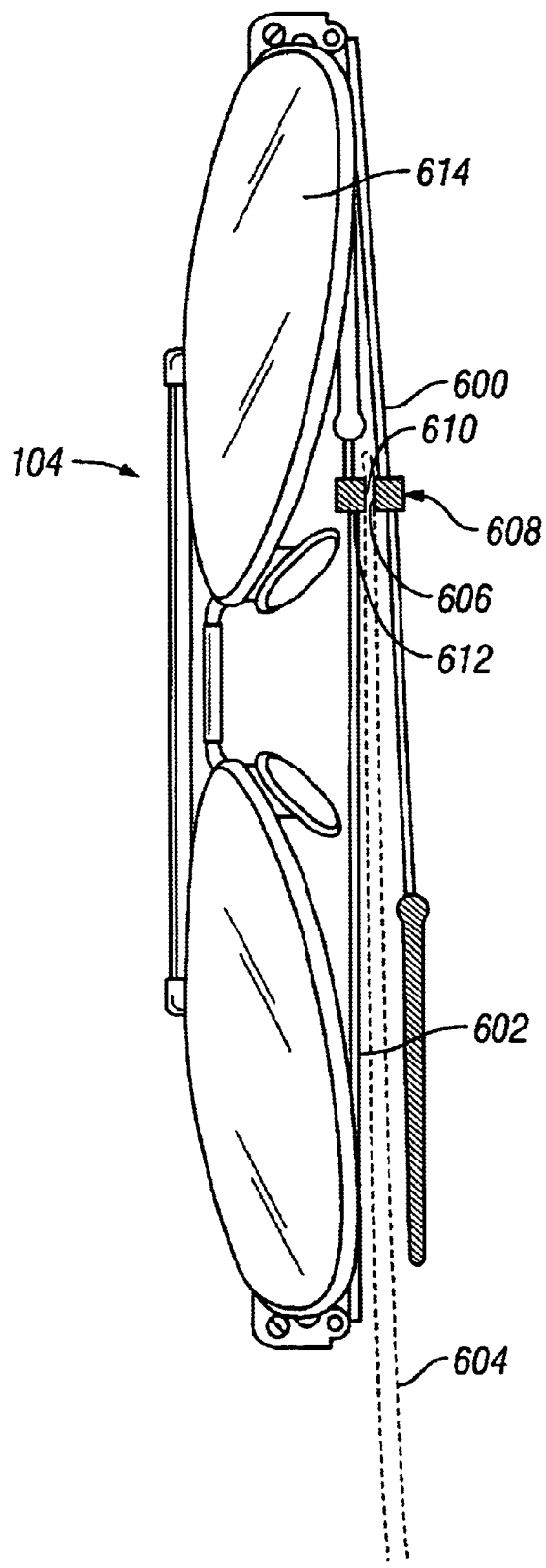
FIG. 6 is a bottom view of the eyeglasses incorporating the eyeglasses clasp with the temple bars pivoted in the closed position.

Referring now to FIG. 6, the left temple bar 600 and the right temple bar 602 of the eyeglasses clasp 104 are pivoted into the closed position. The left temple bar 600 is positioned outside a clothing material 604. The right temple bar 602 is positioned inside the clothing material 604. Thus, the clothing material 604 is located between the temple bars 600, 602. During use, the wearer pivots one of the temple bars 600, 602 into the closed position. The wearer then positions the eyeglasses frame body 114 and the closed temple bar on one side of the clothing material 604. The wearer then pivots the other temple bar into the closed position such that it is on the other side of the clothing material 604. The South pole side 606 of the magnetic means 608 faces and aligns with the North pole side 610 of magnetic means 612. Although on either side of the clothing material 604, the magnetic means 608, 612 are in attractive magnetic communication with each other. The attractive magnetic communication is strong enough to impart a gripping force on the clothing material 604, thereby holding the eyeglasses 614 securely clasped to clothing material 604. The gripping force substantially prevents relative movement between the temple bars 600, 602 and the clothing material 604 while the temple bars 600, 602 are in the closed position. The magnetic means 608, 612 are strong enough to keep the eyeglasses 614 in place even when the eyeglasses 614 are jarred. The magnetic means 608, 612 are also able to maintain this strength because the magnetic flux is not diminished by repeated use. It should be appreciated that either temple bar 600, 602 may be pivoted into the closed position before the other and still be within the scope of the invention.

Figure 7:
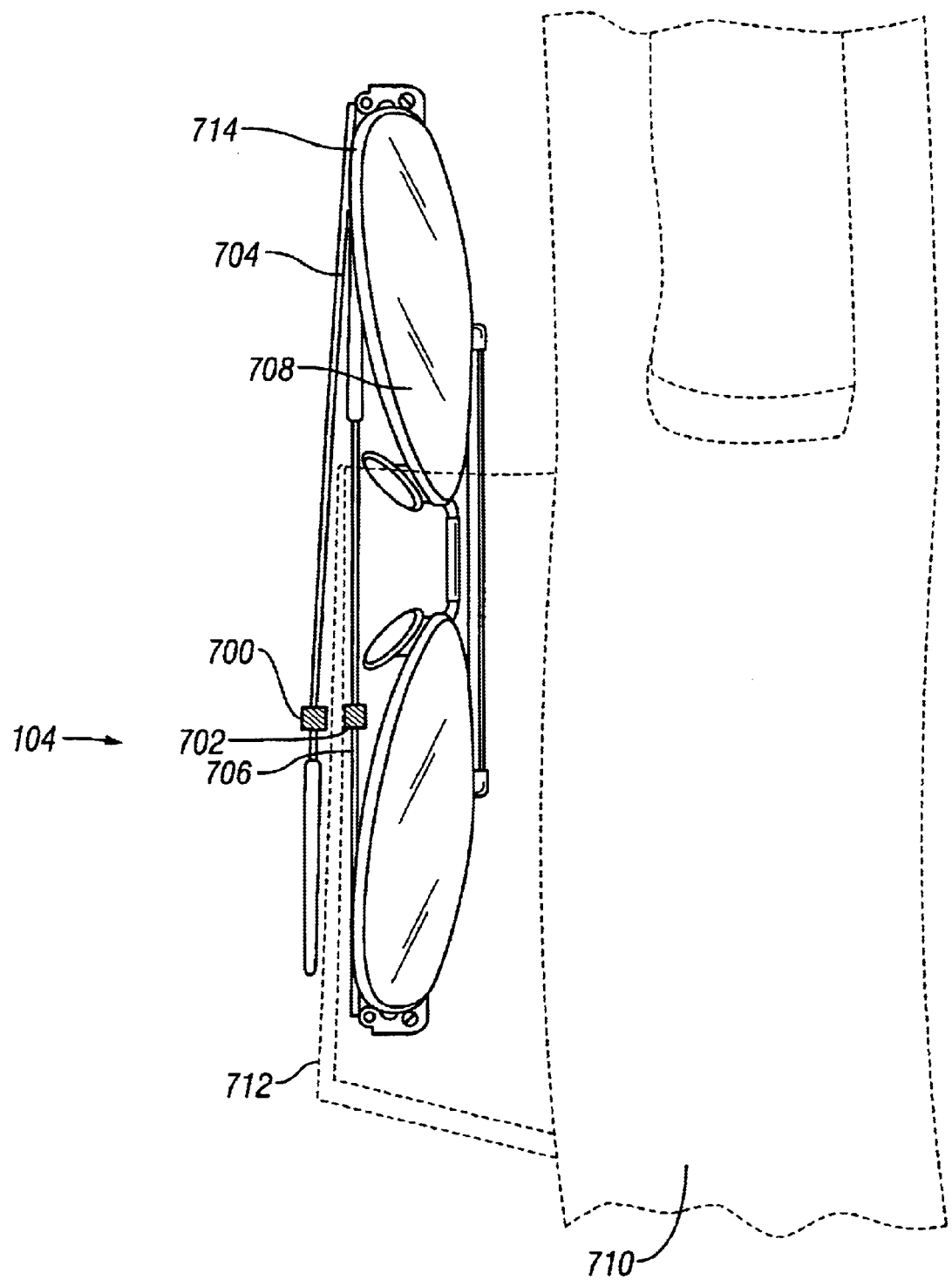
FIG. 7 is a bottom view of the eyeglasses incorporating the eyeglasses clasp with the temple bars pivoted in the closed position depicting use of the clasp with clothing material.

Referring now to FIG. 7, there is shown how the eyeglasses clasp 104 clasps eyeglasses 708 to a clothing material 712 by magnetically clasping to any portion of the clothing material 712. In FIG. 7, opposite pole magnetic attracting forces emanate from the magnetic means 700, 702 attached to the temple bars 704, 706, respectively. Clasping is achieved by folding the temple bar 706 and sliding the temple bar 706 and the frame body 714 into a pocket, lapel, neck collar, or the like. The wearer then folds the temple bar 704 outside the garment 710, thereby placing the temple bars 704, 706 in attractive magnetic communication through the clothing material 712. Alternatively, clasping may be achieved by sliding either of the temple bars 704, 706 into a pocket, lapel, neck collar, or the like, and folding the frame body 714 and the other temple bar outside of the garment 710. In addition, clasping may be achieved by folding the temple bar 704 and sliding the temple bar 704 and the frame body 714 into the garment 710. The wearer then folds the temple bar 706 outside the garment 710. It should be appreciated that either temple bar 704, 706 may be pivoted into the closed position before the other and still be within the scope of the invention.

The present invention eliminates difficulties associated with using a support article by, in effect, using the eyeglasses themselves as a means for clasping onto any material through which the magnets may remain in attractive magnetic communication. For example, a separate support article incorporated in clothing would be cumbersome in washers and dryers, difficult to iron, and alter the appearance of the garment whereas the present invention has none of these disadvantages. In addition, unlike mechanical clips that attach to clothing described in the prior art, the present invention is not limited by the requirement that such clips attach to the edge of material. Instead, the clasp of the present invention attaches anywhere through material so that only a hinged edge of the frame body is at the edge of the material. Thus, for example, the present invention permits eyeglasses to be clasped more deeply in a pocket, whereas prior art clips require a greater portion of the eyeglasses to protrude outside the pocket. Moreover, the eyeglasses stay attached regardless of the position in which the clothing material edge is placed.

EXAMPLE 1

The 4-magnet embodiment in FIGS. 4A–4E wherein the magnets 400, 402, 404, 406 are MGO grade 35 Neodymium (Nd—Fe—B) disks 0.25" diameter and 0.1" thick. The shrink-wrap tubing has an OD of 0.350" before shrinking, a wall thickness of 0.020", and is parallel to the temple bars 308, 310. The magnets 400, 402, 404, 406 exhibit a field of 4 kG and require a load of 400 gm for un-clasping.

EXAMPLE 2

The 4-magnet embodiment in FIGS. 4A–4E wherein the magnets 400, 402, 404, 406 are MGO grade 35 Neodymium disks 0.25" diameter and 0.1" thick. The shrink-wrap tubing has an OD of 0.350" before shrinking, a wall thickness of 0.010", and is perpendicular to the temple bars 408, 410. The magnets exhibit a field of 6 kG and require a load of 600 gm for un-clasping.

While specific embodiments have been shown and described, modifications can be made by one skilled in the art without departing from the spirit or teaching of this invention. The embodiments as described are exemplary only and are not limiting. Many variations and modifications of the system and apparatus are possible and are within the scope of the invention. Accordingly, the scope of protection is not limited to the embodiments described, but is only limited by the claims that follow, the scope of which shall include all equivalents of the subject matter of the claims.

What is claimed is:

1. Eyeglasses comprising:
   a frame body having a midpoint;
   a first temple bar pivotally engaged to a first end of the frame body;
   a second temple bar pivotally engaged to a second end of the frame body;
   at least one first hollow magnetic means engaged with the first temple bar at a distance from the frame body first end such that the first hollow magnetic means does not align with the frame body midpoint when the first temple bar is pivoted closed;
   at least one second hollow magnetic means engaged with the second temple bar at a distance from the frame body second end such that the second hollow magnetic means aligns with a corresponding first hollow magnetic means when the second temple bar is pivoted closed;
   wherein the second hollow magnetic means is in attractive magnetic communication with the corresponding first hollow magnetic means at least when the temple bars are pivoted closed; and
   wherein the corresponding first and second hollow magnetic means remain in attractive magnetic communication when the temple bars are closed but separated by clothing material, the attractive magnetic communication imparting a gripping force on the clothing material sufficient enough to substantially prevent relative movement between the temple bars and the clothing material.

2. The eyeglasses in claim 1 wherein:
   each first hollow magnetic means comprises at least one first magnet; and
   each second hollow magnetic means comprises at least one second magnet.

3. The eyeglasses in claim 1 wherein:
   each first hollow magnetic means comprises a first half magnet engaged with a first side of the first temple bar and a second half magnet engaged with a second side of the first temple bar in attractive magnetic communication with the corresponding first half magnet; and
   each second hollow magnetic means comprises a third half magnet engaged with a first side of the second temple bar and a fourth half magnet engaged with a second side of the second temple bar in attractive magnetic communication with the corresponding third half magnet.

4. The eyeglasses in claim 3 wherein the hollow magnets are MGO grade 35 Neodymium.

5. The eyeglasses in claim 1 wherein the hollow magnetic means are covered with a coating to prevent rust.

6. The eyeglasses in claim 1 wherein the hollow magnetic means engage the temple bars with an adhesive.

7. The eyeglasses in claim 1 wherein the hollow magnetic means engage the temple bars with shrink-wrap tubing.

8. Eyeglasses comprising:
   a frame body having a midpoint;
   a first temple bar pivotally engaged to a first end of the frame body;
   a second temple bar pivotally engaged to a second end of the frame body;
   at least one first hollow magnet engaged with the first temple bar at a distance from the frame body first end such that the first hollow magnet does not align with the frame body midpoint when the first temple bar is pivoted closed;
   at least one second hollow magnet engaged with the second temple bar at a distance from the frame body second end such that the second hollow magnet aligns with a corresponding first hollow magnet when the second temple bar is pivoted closed;
   wherein the second hollow magnet is in attractive magnetic communication with the corresponding first hollow magnet at least when the temple bars are pivoted closed; and
   wherein the corresponding first and second hollow magnets remain in attractive magnetic communication when the temple bars are closed but separated by clothing material, the attractive magnetic communication imparting a gripping force on the clothing material sufficient enough to substantially prevent relative movement between the temple bars and the clothing material.

9. The eyeglasses in claim 8 wherein:
   each first hollow magnet comprises a first half magnet engaged on a first side of the first temple bar and a second half magnet engaged on a second side of the first temple bar, the corresponding first and second half magnets being in attractive magnetic communication; and
   each second hollow magnet comprises a third half magnet engaged on a first side of the second temple bar and a fourth half magnet engaged on a second side of the second temple bar, the corresponding third and fourth half magnets being in attractive magnetic communication.

10. The eyeglasses in claim 9 wherein the hollow magnets are MGO grade 35 Neodymium.

11. The eyeglasses in claim 8 wherein the hollow magnets engage the temple bars with an adhesive.

12. The eyeglasses in claim 8 wherein the hollow magnets engage the temple bars with shrink-wrap tubing.

13. The eyeglasses in claim 8 wherein the hollow magnets are covered with a coating to prevent rust.

14. A clasp for eyeglasses, the eyeglasses having a frame body with first and second ends and a midpoint, a first temple bar, and a second temple bar, the temple bars being pivotally engaged with the frame body at the frame ends, the clasp comprising:
   at least one first hollow magnet engageable with the first temple bar at a distance from the frame body first end such that the first hollow magnet does not align with the frame body midpoint when the first temple bar is pivoted closed;
   at least one second hollow magnet engageable with the second temple bar at a distance from the frame body second end such that the second hollow magnet aligns with a corresponding first hollow magnet when the second temple bar is pivoted closed;
   wherein the second hollow magnet is in attractive magnetic communication with the corresponding first hollow magnet at least when the temple bars are pivoted closed; and
   wherein the corresponding first and second hollow magnets remain in attractive magnetic communication when the temple bars are closed but separated by clothing material, the attractive magnetic communication imparting a gripping force on the clothing material sufficient enough to substantially prevent relative movement between the temple bars and the clothing material.

15. The clasp in claim 14 wherein:
   each first hollow magnet comprises a first half magnet engageable on a first side of the first temple bar and a second half magnet engageable on a second side of the first temple bar, the corresponding first and second half magnets being in attractive magnetic communication; and
   each second hollow magnet comprises a third half magnet engageable on a first side of the second temple bar and a fourth half magnet engageable on a second side of the second temple bar, the corresponding third and fourth half magnets being in attractive magnetic communication.

16. The clasp in claim 15 wherein the hollow magnets are MGO grade 35 Neodymium.

17. The clasp in claim 14 wherein the hollow magnets engage the temple bars with an adhesive and held in place with shrink-wrap tubing.

18. The clasp in claim 17 wherein the tubing has a 0.020" OD and has a 0.350" OD before shrinking.

19. The clasp in claim 14 wherein the hollow magnets engage the temple bars with an adhesive.

20. The clasp in claim 14 wherein the hollow magnets engage the temple bars with shrink-wrap tubing.

21. The clasp in claim 14 wherein the hollow magnets are covered with a coating to prevent rust.

22. A method of engaging eyeglasses to a clothing material comprising:
   providing the eyeglasses, the eyeglasses comprising:
      a frame body having a midpoint;
      a first temple bar pivotally engaged to a first end of the frame body;
      a second temple bar pivotally engaged to a second end of the frame body;
      at least one first hollow magnet engaged with the first temple bar at a distance from the frame body first end such that the first hollow magnet does not align with the frame body midpoint when the first temple bar is pivoted closed; and
      at least one second hollow magnet engaged with the second temple bar at a distance from the frame body second end such that the second hollow magnet aligns with a corresponding first hollow magnet when the second temple bar is pivoted closed;
   pivoting the first temple bar to the closed position;
   positioning the frame body and first temple bar on one side of the clothing material;
   pivoting the second temple bar to the closed position such that the second temple bar is on the other side of the clothing material than the frame body and first temple bar; and imparting a gripping force on the clothing material from the corresponding first and second hollow magnets being in attractive magnetic communication through the clothing material.

23. A method of engaging eyeglasses to a clothing material comprising:
   providing the eyeglasses, the eyeglasses comprising:
      a frame body having a midpoint;
      a first temple bar pivotally engaged to a first end of the frame body;
      a second temple bar pivotally engaged to a second end of the frame body;
      at least one first hollow magnet engaged with the first temple bar at a distance from the frame body first end such that the first hollow magnet does not align with the frame body midpoint when the first temple bar is pivoted closed; and
      at least one second hollow magnet engaged with the second temple bar at a distance from the frame body second end such that the second hollow magnet aligns with a corresponding first hollow magnet when the second temple bar is pivoted closed;
   pivoting the first temple bar to the closed position;
   positioning the frame body and first temple bar on one side of the clothing material;
   pivoting the second temple bar to the closed position such that the second temple bar is on the other side of the clothing material than the frame body and first temple bar; and
   imparting a gripping force on the clothing material from the corresponding first and second hollow magnets attracting each other through the clothing material.

24. A clasp for eyeglasses, the eyeglasses having a frame body with first and second ends and a midpoint, a first temple bar, and a second temple bar, the first and second temple bars being pivotally engaged with the frame body at the frame ends by first and second spring action hinges, respectively, the clasp comprising:
   at least one first hollow magnet engaged with the first temple bar at a distance from the frame body first end such that the first hollow magnet does not align with the frame body midpoint when the first temple bar is pivoted closed;
   at least one second hollow magnet engaged with the second temple bar at a distance from the frame body second end such that the second hollow magnet aligns with a corresponding first hollow magnet when the second temple bar is pivoted closed;
   wherein the second hollow magnet is in attractive magnetic communication with the corresponding first hollow magnet at least when the temple bars are pivoted closed; and
   wherein the corresponding first and second hollow magnets remain in attractive magnetic communication when the temple bars are closed but separated by clothing material, the attractive magnetic communication imparting a gripping force on the clothing material sufficient enough to substantially prevent relative movement between the temple bars and the clothing material.

25. The clasp in claim 24 wherein:
   each first hollow magnet comprises a first half magnet engaged on a first side of the first temple bar and a second half magnet engaged on a second side of the first temple bar, the corresponding first and second half magnets being in attractive magnetic communication; and
   each second hollow magnet comprises a third half magnet engaged on a first side of the second temple bar and a fourth half magnet engaged on a second side of the second temple bar, the corresponding third and fourth half magnets being in attractive magnetic communication.

26. The clasp in claim 25 wherein the hollow magnets are MGO grade 35 Neodymium.

27. The clasp in claim 24 wherein the hollow magnets engage the temple bars with an adhesive and held in place with shrink-wrap tubing.

28. The clasp in claim 27 wherein the tubing has a 0.020" OD and has a 0.350" OD before shrinking.

29. The clasp in claim 24 wherein the hollow magnets engage the temple bars with an adhesive.

30. The clasp in claim 24 wherein the hollow magnets engage the temple bars with shrink-wrap tubing.

31. The clasp in claim 24 wherein the hollow magnets are covered with a coating to prevent rust.

32. A clasp for eyeglasses, the eyeglasses having a frame body having first and second ends and a midpoint, the clasp comprising:
   a first temple bar for engagement to the first end of the frame body;
   a second temple bar for engagement to the second end of the frame body;
   at least one first hollow magnet engaged with the first temple bar at a distance from the frame body first end such that the first hollow magnet does not align with the frame body midpoint when the first temple bar is pivoted closed;
   at least one second hollow magnet engaged with the second temple bar at a distance from the frame body second end such that the second hollow magnet aligns with a corresponding first hollow magnet when the second temple bar is pivoted closed;
   wherein the second hollow magnet is in attractive magnetic communication with the corresponding first hollow magnet at least when the temple bars are pivoted closed; and
   wherein the corresponding first and second hollow magnets remain in attractive magnetic communication when the temple bars are closed but separated by clothing material, the attractive magnetic communication imparting a gripping force on the clothing material sufficient enough to substantially prevent relative movement between the temple bars and the clothing material.

33. The clasp in claim 32 wherein:
   each first hollow magnet comprises a first half magnet engaged on a first side of the first temple bar and a second half magnet engaged on a second side of the first temple bar, the corresponding first and second half magnets being in attractive magnetic communication; and
   each second hollow magnet comprises a third half magnet engaged on a first side of the second temple bar and a fourth half magnet engaged on a second side of the second temple bar, the corresponding third and fourth half magnets being in attractive magnetic communication.

34. The clasp in claim 33 wherein the hollow magnets are MGO grade 35 Neodymium.

35. The clasp in claim 32 wherein the hollow magnets engage the temple bars with an adhesive and held in place with shrink-wrap tubing.

36. The clasp in claim 35 wherein the tubing has a 0.020" OD and has a 0.350" OD before shrinking.

37. The clasp in claim 32 wherein the hollow magnets engage the temple bars with an adhesive.

38. The clasp in claim 32 wherein the hollow magnets engage the temple bars with shrink-wrap tubing.

39. The clasp in claim 32 wherein the hollow magnets are covered with a coating to prevent rust.

* * * * *